(12) United States Patent
Söderberg

(10) Patent No.: US 9,471,600 B2
(45) Date of Patent: Oct. 18, 2016

(54) ELECTRONIC DEVICE AND METHOD FOR HANDLING TAGS

(75) Inventor: Joakim Söderberg, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 429 days.

(21) Appl. No.: 14/127,509

(22) PCT Filed: Jun. 21, 2011

(86) PCT No.: PCT/SE2011/050812
§ 371 (c)(1),
(2), (4) Date: Dec. 19, 2013

(87) PCT Pub. No.: WO2012/177192
PCT Pub. Date: Dec. 27, 2012

(65) Prior Publication Data
US 2014/0129981 A1 May 8, 2014

(51) Int. Cl.
G06F 3/048 (2013.01)
G06F 17/30 (2006.01)
G06F 3/0482 (2013.01)

(52) U.S. Cl.
CPC ....... *G06F 17/30268* (2013.01); *G06F 3/0482* (2013.01); *G06F 17/30265* (2013.01)

(58) Field of Classification Search
CPC .............. G06F 3/017; G06F 3/048–3/04883; G06F 9/4443; G06F 17/30038; G06F 17/30867
See application file for complete search history.

(56) References Cited

U.S. PATENT DOCUMENTS

| | | | |
|---|---|---|---|
| 2006/0052109 A1 | 3/2006 | Ashman, Jr. et al. | |
| 2006/0251339 A1* | 11/2006 | Gokturk | G06F 17/30253 382/305 |
| 2008/0071929 A1* | 3/2008 | Motte | G06F 17/3089 709/246 |
| 2010/0162176 A1* | 6/2010 | Dunton | G06F 3/0483 715/862 |
| 2011/0154225 A1* | 6/2011 | Martin | G06F 17/24 715/760 |

OTHER PUBLICATIONS

Takashita, et al., "Tag Recommendation for Flickr Using Web Browsing Behavior," ICCSA 2, Lecture Notes in Computer Science. 2010. pp. 412-421. vol. 6017, Springer.

Li, J. et al., "Real-Time Computerized Annotation of Pictures," IEEE Transactions on Pattern Analysis and Machine Intelligence, IEEE Service Center. Jun. 1, 2008. pp. 985-1002. vol. 30, No. 6.

Li, X. et al., "Learning Social Tag Relevance by Neighbor Voting," IEEE Transactions on Multimedia, IEEE Service Center. Nov. 1, 2009. pp. 1310-1322. vol. 11, No. 7.

\* cited by examiner

*Primary Examiner* — Claudia Dragoescu
(74) *Attorney, Agent, or Firm* — Patent Portfolio Builders, PLLC

(57) ABSTRACT

A method in an electronic device (100) for handling tags associated with an acquired digital image. The method includes displaying the image and the associated tags. The tags are have been assigned relative ranking values and are selected based on the relative ranking values. A selected tag is dissociated from the image by means of the electronic device detecting a user command instructing the device to dissociate a tag from the image.

28 Claims, 6 Drawing Sheets

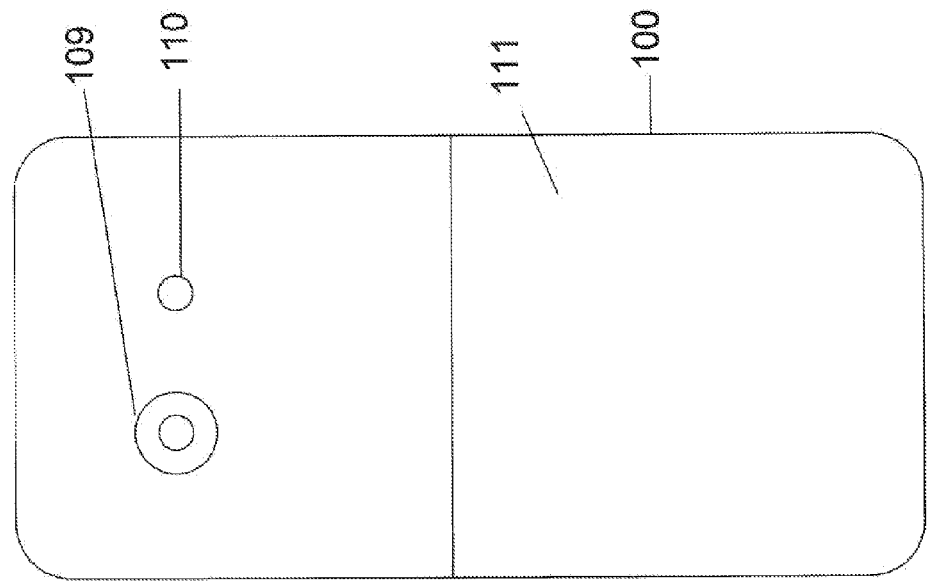
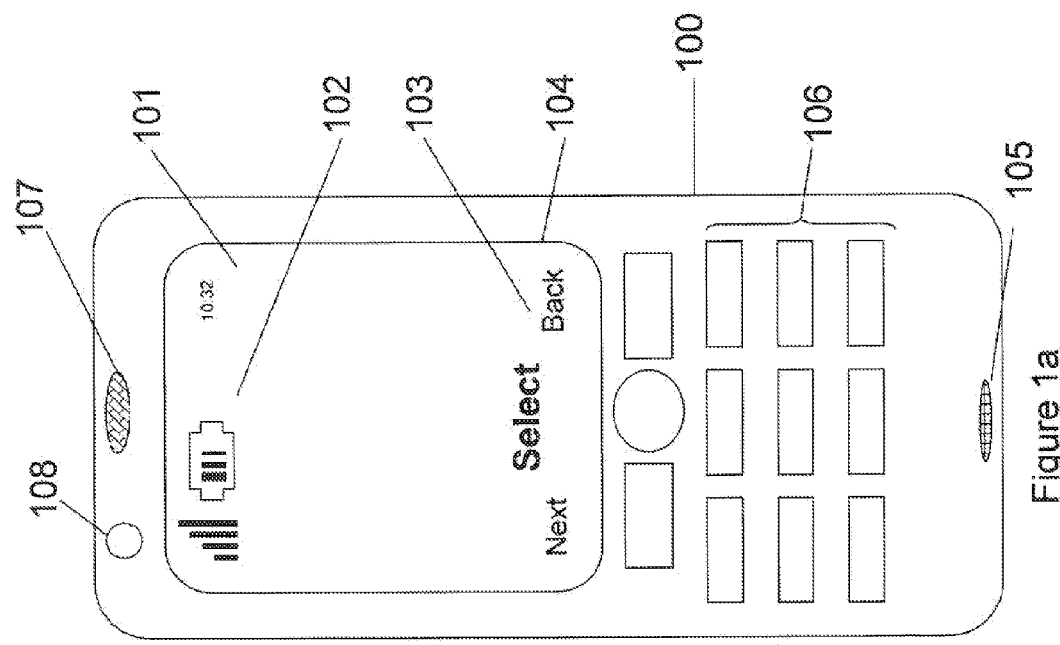

ELECTRONIC DEVICE AND METHOD FOR HANDLING TAGS

TECHNICAL FIELD

The invention generally relates to a method and an electronic device for handling tags associated with a digital image.

BACKGROUND

Digital cameras, cellular phones, tablet PCs and other image capturing devices nowadays allow users to perform image editing. The range of different image capturing devices, especially for digital images, has more or less exploded in the last decade. Modern digital image capturing devices are capable of producing high resolution pictures and together with the development of, and price reduction of, high capacity memories and storage have resulted in users taking photographs on a more or less daily basis, often resulting in very large numbers of digital images being stored.

Therefore, there has also been a need to organize the images, so that they can be easily found and retrieved. One way to achieve this is to name the images depending on their content or depending on when, where or by whom the image was taken. The image name or description can be achieved either by the user manually inserting image annotations and associating them with the image, e.g. a descriptive text associated with the image. An image can also automatically be associated with image tags. Automatic tagging of an image involves e.g. tagging the image with the date the image was taken or with the location where the image was taken. In that way, the date 'when' and the location 'were' the picture was taken are associated with the image in the form of tags. The image tags can subsequently facilitate to organize the images in folders. E.g. a user may want to organize his images from his vacation in Paris, and organizes the images such that all images taken during the date of his vacation are stored in the same folder.

However, an image can be associated with several different tags, and handling, prioritizing, selecting and editing multiple tags becomes cumbersome and taxing for the user. Therefore, there is a need for more user-friendly ways of handling tags associated with an image.

SUMMARY

It is an object of the exemplary embodiments described below to basically address at least some of the problems outlined above. These objects and others may be obtained by providing method and arrangement according to the independent claims attached below.

According to one aspect, a method is provided in an electronic device for handling tags associated with an acquired digital image. The method includes displaying the image and the associated tags on the display unit of the electronic device, where the tags have relative ranking values. The method further includes selecting a tag, displayed with the image, to be dissociated from the image, where the selection of the tag is based on the relative ranking value of the tag. Furthermore, the method includes detecting a first user command, using a user input unit, to dissociate the selected tag from the image and then dissociating the selected tag from the image.

According to a second aspect, an electronic device is provided for handling tags associated with an acquired digital image. The electronic device includes a display unit arranged to display the image and the associated tags, where the tags have relative ranking values. The electronic device further includes a tag selection unit arranged to select a tag displayed on display unit, where the selection of the tag is based on the relative ranking value of the tag. Furthermore, the electronic device includes a user input unit arranged to detect a first user command to dissociate the tag from the image and a tag dissociation unit arranged to dissociate a selected tag from the image.

An advantage that may be achieved when using above solution is that user activities such as handling, editing, and/or prioritizing of tags associated with an image can be facilitated. A digital image may be associated with several tags and the invention provides a method and an apparatus with which the tag handling is simplified and becomes more user-friendly. The tags are relatively ranked and upon detection of a user command tags are removed from, or added, to image.

Further possible features and benefits of the invention will be explained in the detailed description below.

BRIEF DESCRIPTION OF THE DRAWINGS

The solution will now be explained in more detail by means of optional and illustrative embodiments and with reference to the accompanying drawings, in which:

FIGS. 1a and 1b illustratively show an exemplary electronic device;

DETAILED DESCRIPTION

Figure 2:
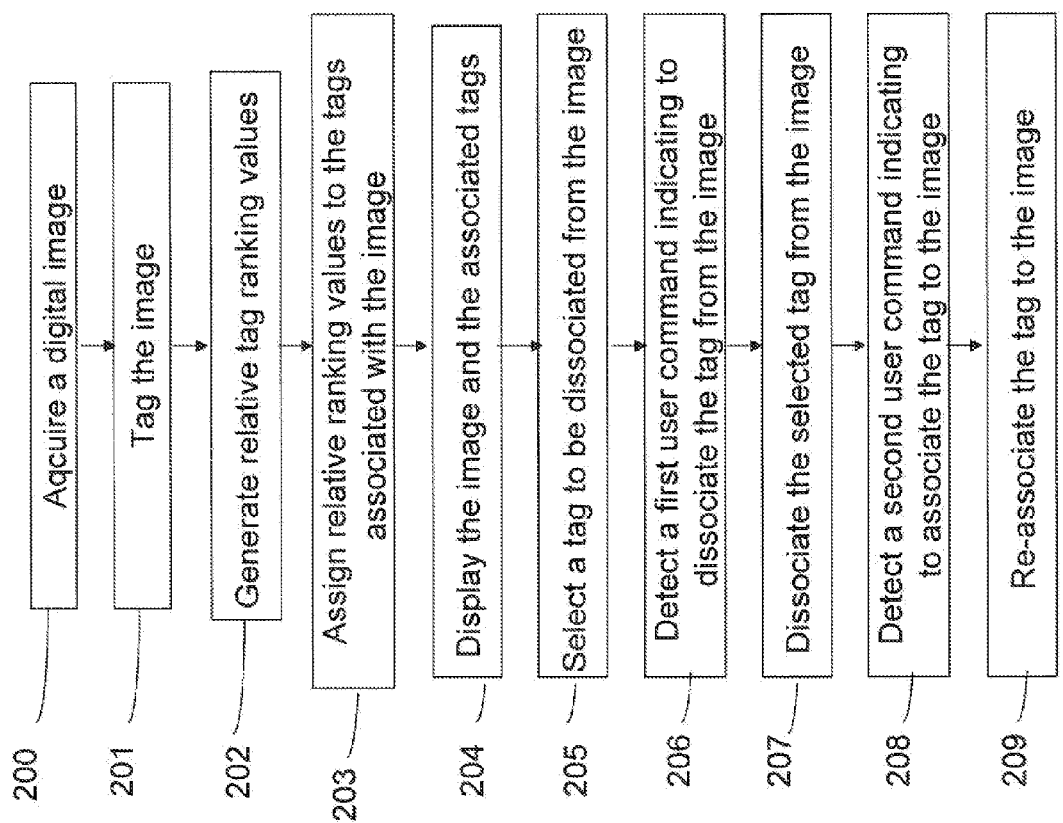
FIG. 2 is a flow diagram of an exemplary embodiment showing how a tag associated with an image is handled at an electronic device.

Briefly described, the embodiments below can be used for an electronic device, such as a digital camera or a cellular phone, that is able to capture or otherwise acquire images and to handle tags, e.g. selecting and editing tags, associated with acquired, e.g. captured, images.

In the following description, the solution will be described in more detail with reference to certain example embodiments and to the accompanying drawings. For purpose of explanation and not limitation, specific details are set forth, such as particular scenarios, techniques, etc., in order to provide a thorough understanding of the embodiments. However, it is apparent to one skilled in the art that the invention is not limited to these examples but may be practiced in other embodiments as compared to the details outlined below.

Moreover, those skilled in the art will appreciate that the functions and means explained herein below may be implemented using software functioning in conjunction with a programmed microprocessor or a general purpose computer, and/or using an application specific integrated circuit (ASIC). It will also be appreciated that while the embodiments are primarily described in the form of methods and devices, the embodiments may also be realized in a computer program product as well as in a system comprising a computer processor and a memory coupled to the processor, wherein the memory is encoded with one or more programs that may perform the functions disclosed herein.

FIGS. 1a and 1b show an illustrative example of an electronic device 100 used in the exemplary embodiments, e.g. a cellular phone. FIG. 1a shows the front side of the electronic device comprising a display area 101 included in a display unit, which is arranged to display acquired images and may also be arranged to serve as a view-finder for capturing images. The display area may include a status indication area 102 and one or more soft key bars 103. The status indication area may for example include symbols indicating battery status, signal strength, speaker on/off, time and date etc.

Electronic devices typically include several user input units, which are arranged to detect user commands and user inputs, whereby the user can control the device. User input units may include soft keys, which are operable by using navigation means or, if the electronic device is equipped with a touch-screen 104, by tapping the soft key bars 103 directly with a pen-like object or a finger. The user input units may further include hard keys, buttons, joysticks, or multidirectional buttons but can also include touch sensitive areas such as a touch-pad or a touch-screen, where the user taps directly on the item displayed on the display. User commands or user inputs can also be detected using voice activation, where the user of the electronic device makes a selection or controls the electronic device using voice control. The user's voice commands are detected using a microphone 105 included in the electronic device. Further, electronic devices may include an accelerometer or a gyroscope that is sensitive to rotational and directional movement of the electronic device. Consequently the accelerometer or gyroscope can be used to detect user commands including, e.g., shaking the electronic device. The shaking is detected using the accelerometer or gyroscope and triggers a certain command. For example, assume that the electronic device is playing a song from a list of songs, and then shaking the electronic device may be indicative of a user command instructing the electronic device to play the next song in the list of songs. Another example of using the accelerometer or gyroscope to detect user commands is that the user may turn or flip the electronic device up-side-down to switch the electronic device into a silent mode. The accelerometer or gyroscope detects the motion of flipping the electronic device up-side-down, which indicates a user command to turn the electronic device into silent mode such that the user and other meeting participants are not disturbed by e.g. ring tones from incoming calls. Proximity sensors or motion sensors are other examples of user input means adapted to detect user commands. Proximity sensors may detect that a user sweeps his hands, or hovers, over the electronic device, thereby detecting user gestures indicating a user command.

An exemplary electronic device, e.g. a mobile phone may also include other elements normally present in such devices, such as a keypad 106, a speaker 107, a microphone 105, a front camera unit 108, a processor, a memory or storage unit, an AM/FM radio transmitter and receiver.

FIG. 1b shows the back side of an exemplary electronic device e.g. a cellular phone, including a backside of the casing, a digital camera unit with a lens 109, a light source 110 serving to provide additional light when capturing images, a battery hatch 111 concealing and protecting a battery and a SIM-card (Subscriber Identity Module). The camera unit can be a digital camera unit and/or a camcorder unit. However, it is not precluded that the camera could be a traditional camera with a photographic film as the first storage means and with further storage units for temporary storage of pictures. The electronic device further includes a communication unit adapted e.g for short-range wireless communication (Bluetooth, Near Field Communication (NFC), Infrared, and Wireless LAN (W-LAN: according to the IEEE 802.11 standards)), long-range wireless communication (e.g. according to cellular standards such as 2G, 3G or Long Term Evolution (LTE or 4G), and/or wired communication. Other examples of electronic devices that can be used in the exemplary embodiments are, but not limited to, tablet PCs, camcorder, compact cameras, system cameras, MP3 players, Laptop PCs, and portable game consoles.

The term "digital camera unit" is used here to represent any camera which records and stores pictures, e.g. photographic images, in digital form that can be fed to a computer as the pictures are recorded or stored in the camera for later loading into a computer or printer, or viewed on the display of a electronic device. A digital camera unit has a built-in computer or (micro)processor, and records pictures in an entirely electronic form. Thus the digital camera does not contain a photographic film. The term "traditional camera unit" represents any camera capable of storing still pictures onto a photographic film. Both types of cameras can contain a series of lenses that focus light to create a picture of a scene. Whilst a traditional camera focuses this light onto a piece of film, the digital camera focuses it onto a semiconductor light sensor that records light electronically; hereafter the computer or (micro)processor breaks this electronic information down into digital data. The digital camera unit is connected to a storage unit for storing images. The storage unit may include first storage means and second storage means. Preferably, the first storage means is a non-volatile but erasable and rewritable storage means, such as e.g. flash memory card, whilst the second storage means typically is a buffer storage means, preferably volatile memory, such as RAM (Random Access Memory). A storage unit, may in the exemplary embodiments, comprise a first and a second storage means. Moreover, the digital camera unit contains an image capturing activation means, which could be a push-down button, a scrollable button, a touch-screen, etc. To capture an image the user activates the image capturing activation means. The digital camera unit moreover comprises elements known to be necessary to make the camera work, but falling beyond the scope of this patent application, such as viewfinder, zoom, shutter, aperture setting, CCD, ADC. The term camera unit in the exemplary embodiment generally refers to digital camera unit but could also refer to a traditional camera unit.

An image may be acquired by the electronic device e.g. by capturing an image using the camera unit or by acquiring the image using the communication unit e.g. downloading an image from the internet or acquiring an image from another electronic device e.g. via short-range communication or messaging services. When an image has been acquired by the electronic device, the image may be tagged, i.e. it is associated with one or more tags. Labeling or tagging an image is carried out to enable or support functions such as classifications, marking ownership, indicate identities, and further to describe image content. Tags can either be associated with the image automatically, i.e. automatic image tagging, or assigned manually, i.e. manual image tagging. An example of automatic image tagging is location-based tagging, also refered to as geo-tagging. Location-based tagging includes associating location coordinates, of where the image was captured, with the image. A GPS (Global Positioning Unit) included in the electronic device may be used to record location or GPS coordinates, which are then associated with the image in the form of image tags. Manually tagging may involve the user manually annotating or describing the image. E.g. a user takes an image of the Eiffel Tower in Paris during his summer vacation and manually inserts the text 'summer' and 'vacation', which is then associated with the captured image. Throughout the following exemplary embodiments, a "tag" will, in general, refer to any type of metadata associated with an image, and, in particular, to metadata associated with the image and also displayed on the display unit together with the image. The term 'image' refers within the illustrative embodiments to a two-dimensional image such as a conventional photograph, or to a three-dimensional image. The word 'image' may within the illustrative embodiments refer to a stand-alone image or to a sequence of images forming a video or movie clip. Some possible image file formats for organizing and storing digital images include JPEG/JFIF, TIFF, BMP, and RAW, to name a few.

An exemplary embodiment of a procedure when an electronic device is used for this solution will now be described with reference to the flow chart in FIG. 2 and with further reference to exemplary electronic devices illustrated in FIGS. 3-6. A digital image is acquired by the electronic device, either by capturing an image using a camera unit or by receiving it using a communication unit included in the electronic device, step 200. An image may e.g. be acquired by downloading it from the internet or from a server or by receiving it from another electronic device. In step 201 the image is tagged, e.g. in the manner described above. In this step, one or more tags may thus be generated, either manually or automatically, and the tags are then associated with the image. Tags associated with an image may further be relatively ranked among them, e.g. by indicating their relevance or subjective importance to the user. This has the advantage that it allows prioritizing and organizing tags, and further facilitates organizing the images based on the ranked image taggings. Assume a set of images, where each image is associated with multiple tags, e.g. a date tag, indicating the time and/or the date the image was captured, and a location-based tag, i.e. a tag indicating the location were the image was captured, and name tags, i.e. a tag indicating who is in the image. If, e.g., the images are to be organized in folders indicating the locations were the images were captured, then the location-based tag may be assigned the highest relative ranking value, and if the images are further to be organized in sub-folders based on the individuals portrayed in the images, then the name tags may be assigned the second highest relative ranking value, and consequently the date tags may be assigned the lowest relative ranking value. In step 202 relative ranking values are generated for tags associated with the image. The relative ranking values may be generated manually by the user based on his preferences or they may be generated automatically by the electronic device, e.g. using a set of predifined criteria. In step 203, the tags are assigned a relative ranking value. When tagging an acquired image, some or all tags may already have relative ranking values, e.g. if the image is acquired from another electronic device or downloaded from the internet, in such a situation steps 202 and 203 are redundant. In another situation the generation of relative ranking values are generated by another electronic device or by a server and the electronic device only assigns the relative ranking values to the tags, and consequently step 202 becomes redundant. In this description, the term "relative ranking value" implies that the ranking value of the tags associated with an image can be compared with each other and it can be determined which tag has the highest ranking, the second highest ranking, the third highest ranking etc, among the tags associated with the image. The relative ranking value is thus a way of prioritizing the tags associated with an image. The prioritazion may be based on user preferences or may be automatically generated based on predefined critierias.

Figure 4C:
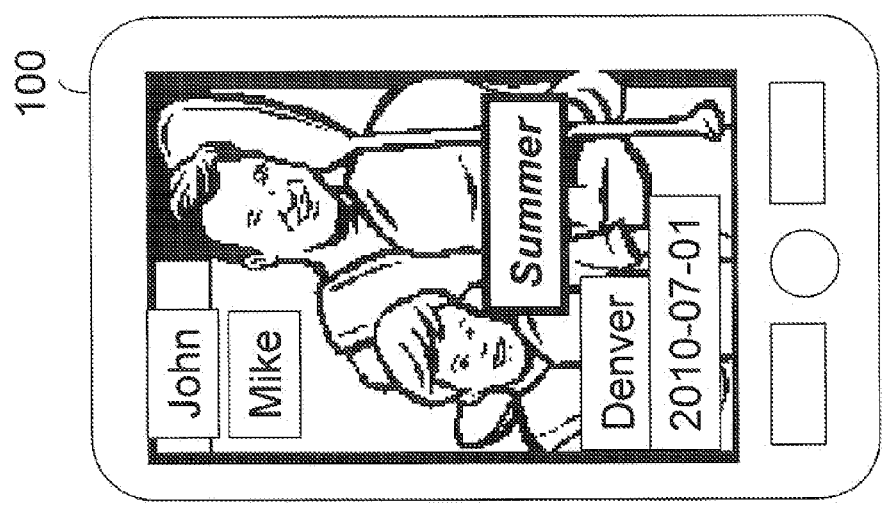
FIGS. 4a-c illustratively show how a tag is dissociated from an image at an electronic device.
Figure 4B:
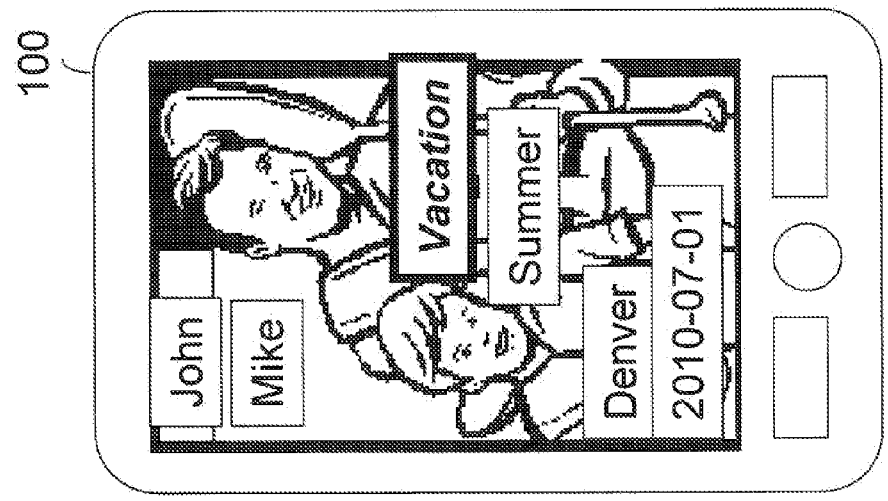
Figure 4A:
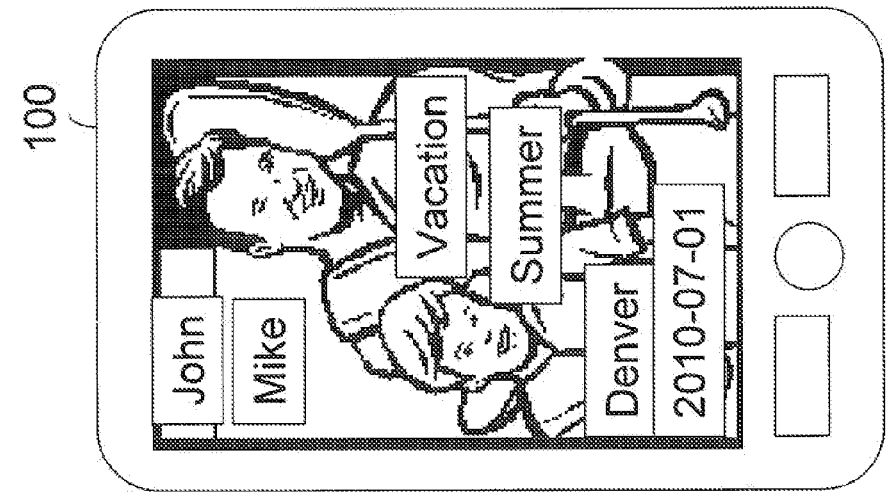

An illustrative embodiment of automatically generating relative ranking values will now be described with reference to FIGS. 4a, 4b and 4c. FIG. 4 shows an image acquired using an electronic device 100, e.g. captured using the camera unit included in the electronic device. In this example, face recognition algorithms have been applied to the image to determine that 'John' and 'Mike' are portrayed in the image. Further, a location tag is associated with the image indicating that the image was captured in Denver, where the location was determined using the GPS included in the elctronic device. Furthermore, the image is associated with a date tag indicating that the image was captured on the $7^{th}$ of July 2010. The associated text tags, or image annotations, 'Summer' and 'Vacation' have also been manually inserted, e.g. the user may have inserted the image annotations using a keypad included in the user input unit of the electronic device. The automatic relative ranking value generation may be set to generate the lowest relative ranking value to manually inserted text tags (image annotations), in this example the tags 'Summer' and 'Vacation'. Then the automatic relative ranking value generation generates relative ranking values to the remaining tags, based on the probability that the tag information is correct. The name tags 'John' and 'Mike' would then be assigned a lower relative ranking value compared to the location tag and the date tag, but higher relative ranking value compared to the text tags. The face recognition algorithm may not be as accurate in recognizing faces as the GPS and clock, or calendar, are in determining the location and the date, respectively. In a similar way, the relative ranking value generated for the location tag 'Denver' may also be lower than the relative ranking value generated for the date tag '2010-07-01' because the probability that the date set by the clock or calendar is correct is higher than the probability that the location determined by the GPS is correct. In the example above the set of criteria used to generate relative ranking values defined that the lowest ranking value should be generated for name tags, and then generate the relative ranking to the remaining tags based on the probility that the tag information is correct.

In another illustrative example the generation of relative ranking values is based on the confidence or probability that a tag is associated with the image content. Image content analysis as such is well known in the art and does not fall within the scope of the described solution. In the image shown in FIG. 4, the name tags 'John' and 'Mike' would have the highest relative ranking value of the tags associated with the image because the name tags have the highest probability of actually representing content portrayed in the image. The date tag '2010-07-01' would then have the lowest relative ranking value because it reflects when the image was captured rather than the image content. In the above example the set of criteria used to generate relative ranking values is based on the probility that a tag is descriptive of the image content.

The set of critiera used to generate the relative tag ranking values, in the above examples, may be selected by the user, e.g. by manually defining or setting the the set of criteria, or the set of criteria may have been predefined in the electronic device.

In step 204, returning to FIG. 2, the image and associated tags are displayed on the display unit of the electronic device. The associated tags may be arranged on the display in an order that reflects their respective relative ranking value, e.g., the tag having the highest relative ranking value, e.g. the name tags, may be displayed in the top left corner of the display and the rest of the tags are displayed in descending order, based on the their relative ranking values, with the tag having the lowest relative ranking value being displayed in the lower left corner, e.g. the date tag. Other arrangements of the tags over the display area based on their relative ranking value would also be possible within the described embodiments.

In order to edit the tags associated with the image, for example dissociate or remove a tag from the image, a tag needs first to be selected. In step 205, a tag associated with the image is selected. The tag may be selected based on the relative ranking value, for example, selecting the tag having the lowest, or the highest, relative ranking value. To visualize which tag is selected, the tag may be visualy highlighted on the display unit. Highlighting the tag may include that the tag is displayed in bold text or that it is given a different colouring, or that it is crossed-over. Highlighting the selected tag makes it easier for the user of the electronic device to see which image associated tag that is selected. Selecting a tag can be done either automatically by a tag selection unit 304 (cf. FIG. 3) included in the electronic device, or manually by the user. The manual selection may be done by tapping the tag displayed on the display unit if the user input unit includes a touch-screen or the tag may be selected using the user input unit including navigation means or any other user input means.

Figure 6:
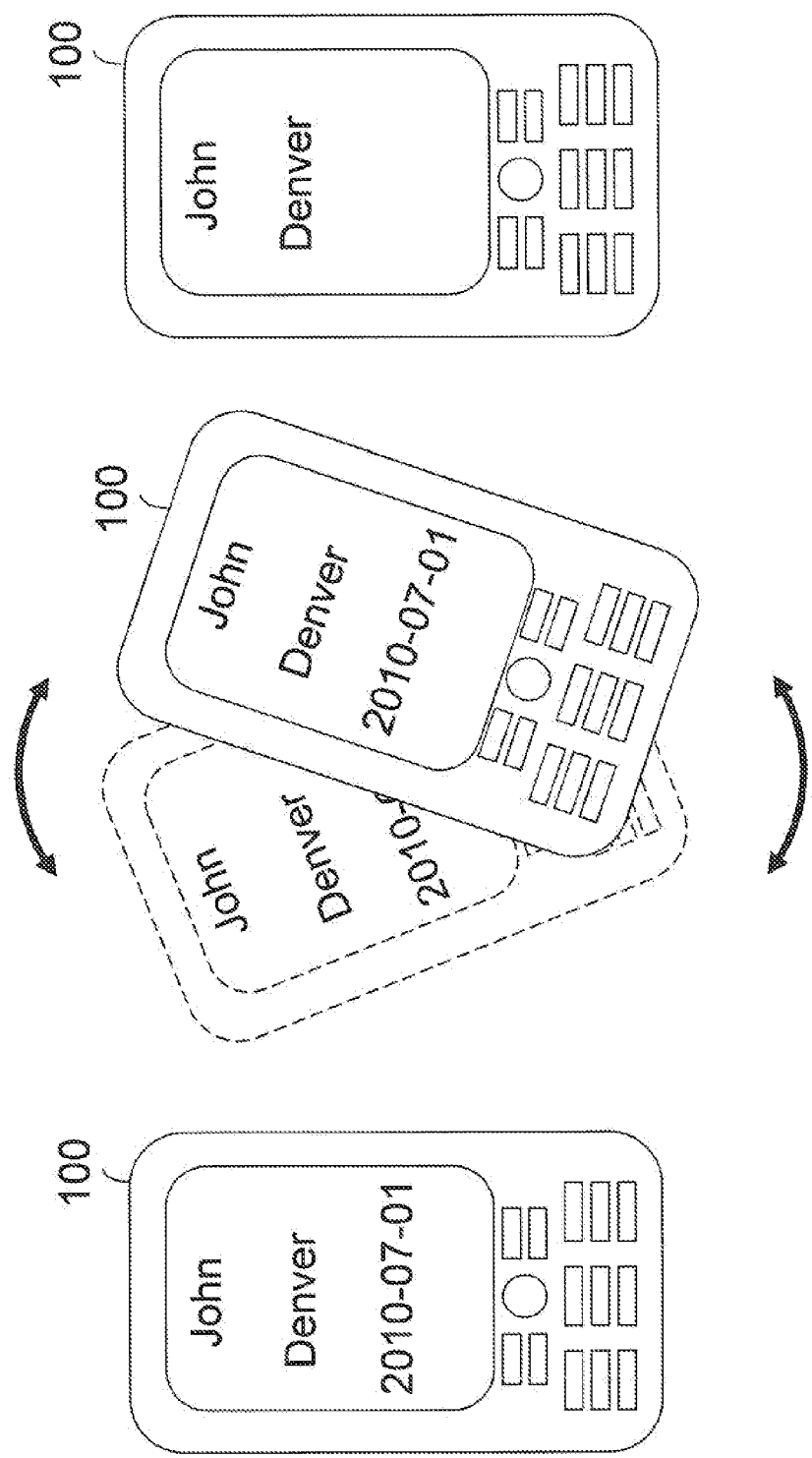
FIG. 6 illustratively shows how a tag is dissociated from an image using a user command at an electronic device.

In step 206, a first user command is detected instructing the device to dissociate the selected tag from the image. The first user command to dissociate the selected tag is detected using the user input unit 302 (cf. FIG. 3). The tag is then dissociated from the image, in step 207. In an exemplary embodiment, the first user command includes tilting, shaking or wobbling the electronic device, as shown in FIG. 6. The user input unit may thus comprise an accelerometer or gyroscope arranged to detect the tilt, shake or wobble by means of. It is noted that the invention is not limited by the first user command being a tilt, wobble or shake. Any user command could be used, e.g. the first user command could be a voice command detected using the microphone or the first user command could be a gesture command whereby the gesture is detected using the camera unit. Dissociating the tag from the image implies that the association of the tag with the image is removed. As a result, a dissociated tag does not appear on the display unit when the image is shown, and further the dissociated tag may not be the included in the image metadata. The dissociated tag may however be stored in a memory included in the storage unit 303 such that it later can be used, for example, so that tag can be re-associated with the image. In step 208, a second user command is detected instructing the electronic device to re-associate the dissociated tag with the image. In an exemplary embodiment, the second user command includes tilting, shaking or wobbling the electronic device, which is detected by the user input unit e.g. by means of an accelerometer or gyroscope. It is noted that the invention is not limited by the second user command being a tilt, wobble or shake. Any user command could be used, e.g. the second user command could be a voice command detected using the microphone or the second user command could be a gesture command whereby the gesture is detected using the camera unit. After the second user command to re-associate the tag with the image is detected, the tag is re-associated to the image, step 209. Re-associating the tag with the image means that the tag appears on the display unit when the image is shown and that the associated tag may be re-included in the image metadata. In the description of various embodiments, associating or re-associating a tag with an image may in practice mean that the tag is added to the image such that the tag is displayed together with the image at the electronic device, and dissociating the tag means that the tag is removed from the image and will thus not be displayed.

Figure 3:
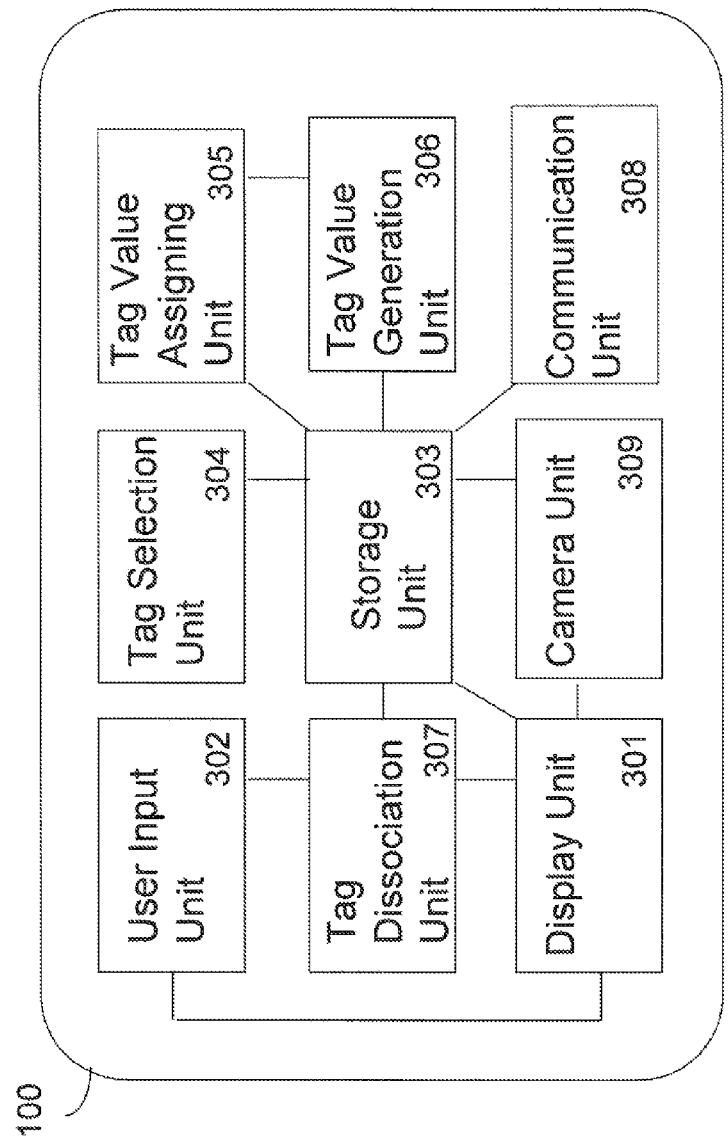
FIG. 3 illustratively shows an exemplary electronic device.

FIG. 3 schematically illustrates an exemplary electronic device, e.g. a mobile phone, a personal digital assistant (PDA), an e-book, a tablet PC, or a digital camera. The electronic device is provided with a display unit 301 arranged to display an image and tags associated with the image. The display unit may include a LCD, OLED, PolyLED, LED, plasma display or other convention display. The tags may be assigned relative ranking values. The display unit may further be arranged to display the tags in an order related to their relative ranking value. In an exemplary embodiment the tag with highest relative ranking may be displayed closest to the top of the display area and then the rest of the tags are displayed in descending order, where the tag having the lowest relative ranking is displayed closest to the bottom of the display area. With reference to FIG. 4 the name tag 'John' would have the highest relative ranking value and the date tag '2010-07-01' would have the lowest relative ranking value. Further, the display unit may be arranged to highlight the selected tag. High-lighting a tag may include a visual indication that the tag is selected. The visual indication may include displaying the selected tag in bold text and/or displaying in a brighter or different color. In FIG. 4b the tag 'Vacation' is selected and highlighted by displaying the letters in bold text. The electronic device further includes a user input unit 302 arranged to detect a first user command. The first user command indicates to dissociate a tag from the image. The user input unit is arranged to detect a first user command that includes a tilting or wobbling or a shaking the electronic device. The user input unit may further include an accelerometer or a gyroscope, where the accelerometer or gyroscope is used to detect that the electronic device is tilted, wobbled or shaken. The user input unit may be further arranged to detect a second user command to associate a dissociated tag to the image, where the tag was previously associated with the image and then dissociated. For the purpose of re-associating dissociated tags the electronic device may further include a storage unit 303, where tags and/or information about tags dissociated from an image is stored. The second user command, used to associate tags, may be different from the first user command. For example, the first user command may include tilting, wobbling or shaking the electronic device around a vertical axis, as shown in FIG. 6. The second user command may include tilting, wobbling or shaking the electronic device around a different axis for example a horizontal axis, or vice versa.

The electronic device further includes a tag selection unit 304. The tag selection unit is arranged to select a tag displayed on display unit, where the selection of the tag is based on the assigned relative ranking value of the tag. The tag selection unit may be arranged to select the tag having the lowest relative ranking value. The advantage with selecting the tag having the lowest relative ranking is that this tag is normally, and depending on the set of criteria, the least interesting and least relevant and can therefore, in the case of an image associated with multiple tags, be removed from the image, e.g. in order to reduce the number of tags associated with the image. E.g. if a user normally organizes his vacation pictures based on the location they were taken, then he define the set of criteria such that the location tag is given the highest relative ranking value and after having captured an image, while on vacation, he immediate removes or dissociates the other tags from the image. The tag selection unit may further be arranged to detect a user command indicating a user selected tag. The tag selection unit may therefore include a touch-screen or navigation keys whereby it can detect user tag selections.

The tag value assigning unit 305, which may be included in the electronic device, is arranged to assign relative ranking values to the tags associated with the image. The tag value assignment includes linking or associating a relative ranking value to the tag. The relative ranking value may have been manually inserted or it may have been generated by the tag value generation unit 306, which may be included in the electronic device. The tag value generation unit 306 is arranged to generate relative ranking values of the tags associated with an image. The tag value generation unit may generate relative ranking values based on a set of ranking criteria. As an example, the set of criteria may include the probability that the tag represents image content, i.e. when the tag generation unit generates a relative ranking value it uses the probability that the tag is representative of the image content as a criteria. Therefore, the tag value generation unit may include image content analysis means and/or algorithms. If it is highly likely that an image annotation or name tag associated with an image corresponds to a person portrayed in the image then that tag is given a higher relative ranking value than an image annotation or name tag not portraying a person in the image. In the illustrative example the image content analysis means or algorithms could include face recognition algorithms to identify the persons portrayed. The tag value generation unit may generate relative ranking values based on ranking criteria set by the user. The user may have defined the set of criteria such that the tag value generation unit generates the highest ranking value for name tags, the second highest relative ranking values for image annotation tags inserted by a user, third highest relative ranking value for location tags or geo tags, fourth highest relative ranking value to date tags. In the exemplary embodiment shown in FIG. 4 then for the name tags 'John' and 'Mike' the tag value generation unit would generate the highest relative ranking, and for the image annotations 'Summer' and 'Vacation' the tag value generation unit would generate the second highest relative ranking value, for the location tag or geo tag 'Denver' the third highest, and the lowest relative ranking value for the date tag '2010-07-01'. In a further illustrative embodiment the set of criteria used by the tag value generation unit may be pre-defined in the tag value generation unit. The tags are often associated with, or based on, image metadata. The metadata could be used by the tag value generation unit to generate relative ranking value. With reference to FIGS. 4a, 4b, and 4c the metadata associated with the image could for example be date, location, image annotation, names of people portrayed.

The electronic device further includes a tag dissociation unit 307. The tag dissociation unit 307 is arranged to dissociate a selected tag from the image. When a tag is selected and user command to dissociate the selected tag from the image is detected using the user input unit 302, then the tag dissociation unit dissociates the tag from the image. The dissociation performed by the tag dissociation unit may include that tag selection unit instructs the display unit not to display the dissociated tag on the display unit and further that the tag is removed from the image metadata. However, the tag dissociation unit may also be arranged to store the tag, or information related to the tag, in the storage unit such that it can, upon registration of a second user command, re-associate the tag to image. The electronic device may further include a communication unit 308, where the communication unit is arranged with a sender and receiver such that data can be sent and received by the electronic device, where the data may be image data and/or tag data. The communication unit may be arranged to send/receive data by establishing short-range and/or long-range wireless and/or wired connections. The communication unit may further be arranged such that the electronic device can access, download data from the internet or post data on the internet. The communication unit may be arranged to receive, i.e. acquire images, e.g. the images may be downloaded from the internet or received from other electronic device using short-range communication protocols, such as Bluetooth, NFC, Infrared, and W-LAN, or using long-range communication (e.g. according to cellular standards such as 2G, 3G or LTE). Finally, the electronic device includes a camera unit 309 arranged to capture images. The camera unit may be a digital camera unit that focuses the image to be captured onto a semiconductor light sensor that records light electronically; hereafter the computer or (micro)processor breaks this electronic information down into digital data. It should be noted that the connection between the units being arranged as shown in FIG. 3 is only one exemplary embodiment and the invention is not limited thereto.

As mentioned above, the FIGS. 4a, 4b, and 4c show an exemplary use-case. Below one further exemplary embodiment of FIG. 4 is described, in which the electronic device is a cellular phone including a display unit, a touch-screen, GPS unit, a camera unit, a storage unit, and a user input unit including an accelerometer unit. An image is captured using the camera unit and is stored in the storage unit. The image is thereafter associated with tags. Face recognition algorithms are applied to the image and recognizes two persons portrayed, John and Mike. The image is consequently associated with the name tags 'John' and 'Mike'. Further, when the image was captured the GPS unit detected the geographical coordinates, which corresponded to the city of 'Denver' and the image is associated with the location tag 'Denver' (alternatively the GPS or geographical coordinates could be used as location tag). The electronic device further recorded the date when the image was captured as Jul. 1, 2010 is associated with the date tag '2010-07-01'. Furthermore, the image annotations 'Summer' and 'Vacation' are associated with the image. The image annotations are user input text, i.e. the user manually typed the text using text input means such as a keyboard, e.g. the touch-screen overlays the display unit that displays a keyboard and the user text inputs 'Summer' and 'Vacation' are detected using the touch-screen included in the user input unit. The image and the associated tags are then stored in the storage unit. The tag value generation unit generates relative ranking values of tags associated with the image and thereafter the tag value assigning unit assigns the tags their relative ranking values. The tag value generation unit generates relative ranking values based on a set of criteria. The set of criteria is that, firstly, tags are ranked based on the probability that they represent image metadata related to the content portrayed in the image. The name tags 'John' and 'Mike', therefore, e.g., receive the ranking value 5, the location based tag 'Denver' gets lower ranking than the name tags but a higher ranking than the date tag, e.g. a ranking value 3, because it is still probable the location tag may be representative of the scenery of the image (but still less probable than that the name tags are representative of the content portrayed), whereas the date tag only indicate when the image was captured and there have low or zero probability of representing the content portrayed. The date tag consequently is assigned a relative ranking value lower than the location tag, e.g. a relative ranking value 1. The first criteria also included that image annotation should be given the lowest relative ranking value, in this illustrative example the image annotations 'Summer' and 'Vacation' are assigned the relative ranking value 0. The second criteria, secondary to the first criteria, are that the tags associated with the image should be ranked in alphabetic order. Therefore, the tag value generation unit generates a higher ranking for the name tag 'John' and a lower relative ranking value for 'Mike'. The same criteria is applied to the image annotations 'Summer' and 'Vacation', where based on the second criteria the tag value generation unit generates a higher relative ranking value for the image annotation 'Summer' and a lower image annotations for the image annotation 'Vacation'. In the illustrative embodiment the tag value generation unit will generate the following ranking value based on the set of criteria: John (5), Mike (4), Denver (3), 2010-07-01 (2), Summer (1) and Vacation (0). The set of criteria could have been defined by the user, e.g. the set of criteria could be defined by the user giving user commands, which are detected by the user input unit of the electronic device, indicating the set of criteria, Defining the set of criteria may include selecting the criteria from a list of predefined criteria or the set of criteria could include manually programming the set of criteria. The set of criteria may also have been pre-defined by the tag value generation unit.

Figure 5B:
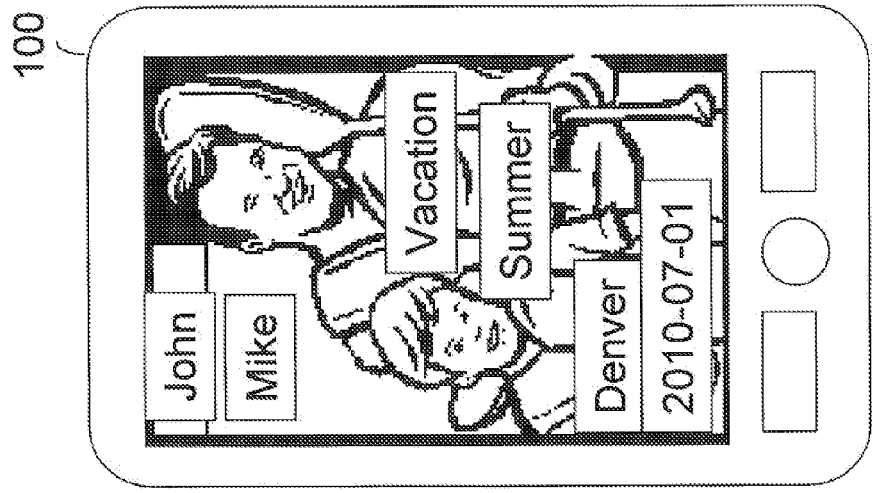
FIGS. 5a and 5b illustratively show how a dissociated tag is re-associated with an image at an electronic device.
Figure 5A:
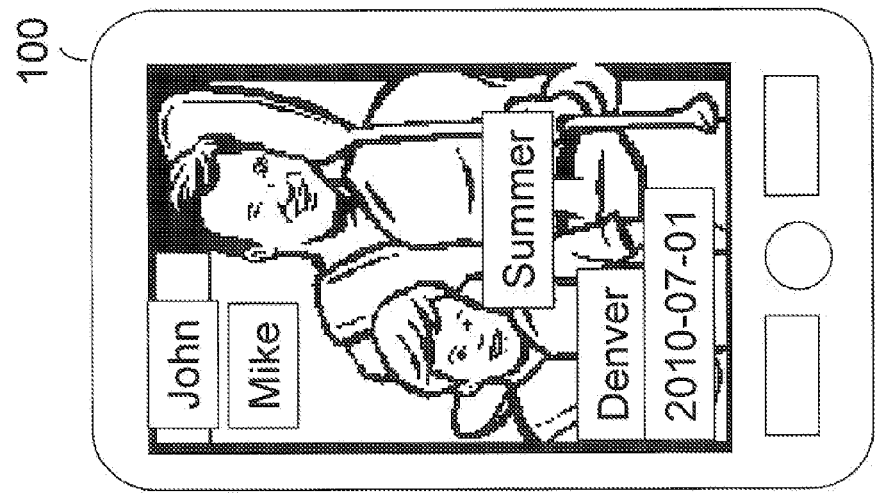

The tag selection unit selects a tag from the tags associated with the image, where selection is based on the relative ranking value of the tag. In the illustrative embodiment the tag selection unit is arranged to select the tag assigned the lowest relative ranking value. In the illustrative embodiment the tag selection unit would then select the image annotation tag 'Vacation'. The display unit displays the image and the associated tags and the selected tag 'Vacation'. The display unit is arranged to highlight the selected tag, e.g. the selected tag is displayed in bold text, as shown in FIGS. 4a and 4b. Thereafter, the user input unit detects a first user command to dissociate the selected tag from the image. The first user commands to dissociate the selected tag include tilting or wobbling or shaking the electronic device. The user input unit includes an accelerometer unit that is able to detect tilting, wobbling or shaking the electronic device. When the user input unit detects the first user command to dissociate the tag, it communicates with the tag dissociation unit, which dissociates the selected tag from the image. The dissociated tag is removed and not further displayed on the display unit. However, information about the disassociated tag may be stored in the storage unit such that the tag can be re-associated with the image. The re-association of the image annotation tag 'Vacation' is illustratively presented in FIGS. 5a and 5b. The tag selection unit selects the next tag, i.e. the tag assigned the lowest relative ranking among the tags that are still associated with the image, which in this case is the image annotation tag 'Summer'. If however, the user of the electronic device changes his mind and would like to re-associate the dissociated tag 'Vacation' image he instructs the electronic device using a second user command to re-associates the dissociated tag to the image. The user input unit is therefore further arranged to detect a second user command to associate a dissociated tag to the image. The second user command is preferably different from the first user command, e.g. the first user command includes tilting, wobbling or shaking the electronic device around a horizontal axis and the second command includes tilting, wobbling or shaking the electronic device in a around a vertical axis (or around any other axis that is orthogonal to the horizontal axis) or vice versa. The user input unit detects the second user command indicating to associate the disassociated tag to image again. The tag dissociation unit re-associates the dissociated tag. The tag is once again associated with the image and again displayed on the display unit along with the image and associated tags. The sequence of re-associating the dissociated image annotation tag is shown in FIG. 5. An advantage of the solution in the embodiment is that offers a simple and user-friendly way of removing tags associated with an image.

FIG. 6 illustrates wobbling the electronic device. The image tags 'John', 'Denver' and '2010-07-01' are displayed on the display unit. In FIG. 6 the date tag '2010-07-01' has the lowest relative ranking value, and is selected. The electronic device in FIG. 6 includes means, e.g. an accelerometer or a gyroscope, to detect that the electronic device is wobbled, tilted or shaken. There are also other means to detect that the electronic device is wobbling, e.g. motion sensors or the camera unit could be used to detect that the electronic device is wobbling. In one embodiment the user input unit includes means, e.g. an accelerometer or a gyroscope, to detect a first command to dissociate the tag from the image, where the first user command includes wobbling, tilting or shaking the electronic device. The first user command may include wobbling, tilting or shaking the electronic device in a first direction, as shown in FIG. 6. The user input unit may further be arranged to detect a second user command to associate a previously dissociated tag to the image. The second user commands may include wobbling, tilting or shaking the electronic device. The second user command may include wobbling, tilting or shaking the electronic device in second direction, which may be different from the first direction shown in FIG. 6. It is noted the invention is not limited to the first and second user commands including wobbling, tilting or shaking the electronic device. Once the user input unit, included in the electronic device, has detected a first user command, as shown in FIG. 6, the selected date tag is dissociated from the image and thereby also removed from the display unit.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method in an electronic device for handling a plurality of tags associated with an acquired digital image, the method comprising:
   displaying the acquired digital image and the plurality of associated tags on a display unit, the tags having relative ranking values, wherein displaying the plurality of associated tags comprises highlighting a tag, of the plurality of associated tags,
   to be dissociated from the acquired digital image, wherein the highlighting of the tag is based on the relative ranking value of the tag;

detecting a first user command, using a user input unit, to dissociate the highlighted tag from the acquired digital image; and dissociating the highlighted tag from the acquired digital image.

2. The method as claimed in claim 1, further comprising:
assigning the relative ranking values to one or more of the plurality of tags associated with the acquired digital image.

3. The method as claimed in claim 2, wherein assigning the relative ranking values to the one or more tags comprises:
generating the relative ranking values for the one or more tags associated with the acquired digital image.

4. The method as claimed in claim 3, wherein the generation of the relative ranking values is based on a set of ranking criteria.

5. The method as claimed in claim 4, wherein the set of ranking criteria is defined in response to a user command detected using the user input unit included in the electronic device.

6. The method as claimed in claim 1, wherein the tags are displayed in an order related to the relative ranking values of the tags.

7. The method as claimed in claim 1, wherein a tag having lowest relative ranking value of the plurality of tags associated with the acquired digital image is highlighted.

8. The method as claimed in claim 1, wherein the first user command comprises tilting or wobbling or shaking the electronic device in a first direction.

9. The method as claimed in claim 1, wherein the dissociated tag is not displayed on the display unit of the electronic device after disassociation.

10. The method as claimed in claim 1, further comprising:
detecting a second user command to associate the dissociated tag to the acquired digital image.

11. The method as claimed in claim 10, further comprising:
associating the dissociated tag to the acquired digital image, in response to the detecting a second user command.

12. The method as claimed in claim 11, wherein the second user command comprises tilting or wobbling or shaking the electronic device in a second direction.

13. The method as claimed in claim 1, wherein the relative ranking value of each tag is associated with a probability that the tag is related to content of the acquired digital image.

14. The method as claimed in claim 1, wherein the relative ranking value of each tag is based on a type of metadata associated with the tag.

15. An electronic device for handling a plurality of tags associated with an acquired digital image, the electronic device comprising:
a display unit arranged to display the acquired digital image and the plurality of associated tags, the tags having relative ranking values, wherein the display unit is further arranged to highlight a tag, of the plurality of associated tags, to be dissociated from the acquired digital image,
wherein the highlighting of the tag is based on the relative ranking value of the tag;
a user input unit arranged to detect a first user command to dissociate the highlighted tag from the acquired digital image; and
a tag dissociation unit arranged to dissociate the highlighted tag from the acquired digital image.

16. The electronic device as claimed in claim 15 further comprising:
a tag value assigning unit arranged to assign the relative ranking values to one or more of the plurality of tags associated with the acquired digital image.

17. The electronic device as claimed in claim 16 further comprising:
a tag value generator unit arranged to generate the relative ranking values for the one or more tags associated with the acquired digital image.

18. The electronic device as claimed in claim 17, wherein the tag value generator unit is further arranged to generate the relative ranking values based on a set of ranking criteria.

19. The electronic device as claimed in claim 18, wherein the user input unit is further arranged to detect a user command defining the set of ranking criteria.

20. The electronic device as claimed in claim 15, wherein the relative ranking value of each tag is associated with a probability that the tag is related to content of the acquired digital image.

21. The electronic device as claimed in claim 15, wherein the relative ranking value of each tag is based on a type of metadata associated with the tag.

22. The electronic device as claimed in claim 15, wherein the display unit is further arranged to display the tags in an order related to the relative ranking values of the tags.

23. The electronic device as claimed in claim 15, wherein the display unit is further arranged to highlight a tag assigned lowest relative ranking value of the tags associated with the acquired digital image.

24. The electronic device as claimed in claim 15, wherein the user input unit is further arranged to detect the first user command as a tilt or a wobble or a shake of the electronic device in a first direction.

25. The electronic device as claimed in claim 15, wherein the tag dissociation unit is further arranged to remove the disassociated tag from the display unit.

26. The electronic device as claimed in claim 15, wherein the user input unit is further arranged to detect a second user command indicating to associate the dissociated tag to the acquired digital image.

27. The electronic device as claimed in claim 26, wherein the second user command comprises a tilt or a wobble or a shake of the electronic device in a second direction.

28. The electronic device as claimed in claim 15, wherein the user input unit comprises an accelerometer unit or a gyroscope unit.

* * * * *